US006842795B2

(12) United States Patent
Keller

(10) Patent No.: US 6,842,795 B2
(45) Date of Patent: Jan. 11, 2005

(54) METHODS AND APPARATUS FOR SHIFTING FOCUS BETWEEN MULTIPLE DEVICES

(75) Inventor: Jay Keller, Sunnyvale, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 116 days.

(21) Appl. No.: 10/167,265

(22) Filed: Jun. 10, 2002

(65) Prior Publication Data

US 2003/0229731 A1 Dec. 11, 2003

(51) Int. Cl.$^7$ ................................................. G06F 3/00
(52) U.S. Cl. ............................ 710/15; 710/14; 710/62; 710/72; 709/220; 345/156; 345/700; 345/710; 345/737; 345/856; 345/862; 345/864
(58) Field of Search ...................... 710/15, 14, 62, 710/72; 709/220; 345/700, 710, 737, 856–866, 156–184

(56) References Cited

U.S. PATENT DOCUMENTS

| | | | |
|---|---|---|---|
| 4,760,388 A | | 7/1988 | Tatsumi et al. |
| 4,884,068 A | | 11/1989 | Matheny et al. |
| 5,265,251 A | | 11/1993 | Agarawal et al. |
| 5,568,164 A | | 10/1996 | Ogawa |
| 5,748,189 A | * | 5/1998 | Trueblood ................ 345/755 |
| 5,844,553 A | | 12/1998 | Hao et al. |
| 5,923,307 A | | 7/1999 | Hogle, IV |
| 6,069,615 A | | 5/2000 | Abraham et al. |
| 6,148,304 A | | 11/2000 | de Vries et al. |
| 6,295,051 B1 | * | 9/2001 | Kanevsky et al. .......... 345/163 |
| 6,313,880 B1 | | 11/2001 | Smyers et al. |
| 6,545,669 B1 | * | 4/2003 | Kinawi et al. .............. 345/173 |
| 6,601,129 B1 | * | 7/2003 | Arakeri et al. .............. 710/316 |

FOREIGN PATENT DOCUMENTS

| | | |
|---|---|---|
| JP | 2000122806 | 4/2000 |
| WO | WO 00/26803 | 5/2000 |
| WO | WO 02/03186 A2 | 1/2002 |

OTHER PUBLICATIONS

Underhill, Sandra, "Dual Monitors with Your Windows PC", Jul. 27, 2000, download from http://www.windows-help.net/features/dualmonitors.html on Mar. 26, 2002. 3pgs.

Presenters Online: "Presentation Training", download from http://www.presentersoline.com/training/pull_tog/tutorials/train_article_2monitors.html on Mar. 26, 2002. ©2001— Epson America, Inc., 3pgs.

* cited by examiner

*Primary Examiner*—Jeffrey Gaffin
*Assistant Examiner*—Niketa Patel

(57) ABSTRACT

A system, method, apparatus, means, and computer program code for shifting focus between multiple devices. In some embodiments, a method in accordance with the present invention may include determining a rule regarding when focus shifts from a first device, or an application operating on the first device, to a second device, or an application operating on the second device, and changing focus from the first device to the second device or their respective applications in accordance with the rule. The rule may be based on position or movement of a cursor on a display associated with the first device.

5 Claims, 6 Drawing Sheets

US 6,842,795 B2

METHODS AND APPARATUS FOR SHIFTING FOCUS BETWEEN MULTIPLE DEVICES

FIELD OF THE INVENTION

The present invention relates to a method and apparatus for shifting focus between multiple devices.

BACKGROUND OF THE INVENTION

Many people commonly use multiple electronic devices such as computers, cellular telephones, personal data assistants (PDAs), etc. In some circumstances, two of the devices may be connected together to allow data to be interchanged between the devices. For example, a PDA may be connected to a computer by means of a cable to transfer data or programs between the two devices. Such communication between the two devices may occur periodically to keep both of the devices updated or synchronized. Typically, the PDA is placed in a cradle, dock, or other docking station or dock that is connected via the cable to the computer.

A user may leave the PDA in the docking station while using the computer. While the PDA is in the cradle, the user may update information and programs on the PDA by directing the computer or performing actions on the computer. Unfortunately, the user is unable to interact directly with the PDA using the keyboard, mouse, or other input device connected to the computer. For example, suppose the user is working on the computer with a PDA in a cradle that is attached to the computer. A reminder alarm sounds on the PDA as a result of a scheduling program operating on the PDA. If the user wishes to clear or cancel the reminder on the PDA, the user must remove his or her hands from the keyboard or mouse in order to interact with the PDA's touch screen or other input device. Thus, changing interaction between the user and the PDA and computer, or vice versa, requires the user to change from using input device(s) associated with the PDA to using input devices associated with the computer, and vice versa. In this case, despite the connection between the PDA and the computer, the user is interacting with the two devices independently.

While the computer may allow indirect interaction with some of the functions of the PDA while the PDA is in the cradle, the user cannot use the keyboard and mouse to directly interact with the PDA, switch focus between the computer and the PDA, or use integrate use of the PDA and computer.

It would be advantageous to provide a method and apparatus that overcame the drawbacks of the prior art. In particular, it would be desirable to provide methods, apparatus, means and computer code that facilitated the use of input devices connected to one device with other devices in an integrated manner while allowing focus between the two devices to be controlled by a user with the input devices.

SUMMARY OF THE INVENTION

Embodiments of the present invention provide a system, method, apparatus, means, and computer program code for shifting focus between multiple devices and/or for facilitating use of one or more input devices connected to one device with one or more other devices in an integrated manner while allowing focus between the devices to be controlled by a user with the input device(s). Different rules may govern when focus is shifted from the first device to the second device as compared to when focus is shifted from the second device to the first device. In some embodiments, both devices may be of the same type (e.g., personal computers). In other embodiments, the devices may be of different types (e.g., a personal computer and a personal data assistant).

Additional objects, advantages, and novel features of the invention shall be set forth in part in the description that follows, and in part will become apparent to those skilled in the art upon examination of the following or may be learned by the practice of the invention.

According to some embodiments of the present invention, a method for changing focus between a first device and a second device may include determining a plurality of devices; determining a rule regarding when focus shifts from a first of the plurality of devices to a second of the plurality of devices; and changing focus from the first of the plurality of devices to the second of the plurality of devices in accordance with the rule. In some other embodiments, a method for changing focus between a first device and a second device may include determining a plurality of devices; determining a spatial arrangement between a display associated with a first of the plurality of devices and a display associated with a second of the plurality of devices; and changing focus between the first of the plurality of devices and the second of the plurality of devices based on movement of a cursor on the display associated with the first of the plurality of devices. In some still further embodiments, a method for changing focus between a first device and a second device may include determining a plurality of devices; determining a spatial arrangement between a display associated with a first of the plurality of devices and a display associated with a second of the plurality of devices; changing position of a cursor from the display associated with the first of the plurality of devices to the display associated with the second of the plurality of devices when the cursor is positioned in a designated area on the display associated with the first of the plurality of devices; and changing focus between the first of the plurality of devices and the second of the plurality of devices when the cursor is positioned in a designated area on the display associated with the first of the plurality of devices.

According to some embodiments of the present invention, a system for changing focus between a first device and a second device may include a first device; a second device; and software operating in conjunction with the first device and the second device, the software being operative to determine a rule regarding when focus shifts from a first device to the second device; and change focus from the first device to the second device in accordance with the rule. The software may be operating on the first device and/or on the second device. In some further embodiments, a system for changing focus between a first device and a second device may include a first device; a second device; and software operating in conjunction with the first device and the second device, the software being operative to: determine a spatial arrangement between a display associated with the first device and a display associated with the second device; and change focus between the first device and the second device based on movement of a cursor on the display associated with the first of the plurality of devices. In some still further embodiments, a system for changing focus between a first device and a second device may include a first device; a second device; and software operating in conjunction with the first device and the second device, the software being operative to: determine a spatial arrangement between a display associated with the first device and a display associated with the second device; change position of a cursor from the display associated with the first device to the display associated with the second device when the cursor is positioned in a designated area on the display associated with the first device; and changing focus between the first device and the second device when the cursor is positioned in a designated area on the display associated with the first device.

According to some embodiments of the present invention a computer program product in a computer readable medium for changing focus between a first device and a second device may include first instructions for identifying a plurality of devices; second instructions for identifying a rule regarding when focus shifts from a first of the plurality of devices to a second of the plurality of devices; and third instructions for shifting focus from the first of the plurality of devices to the second of the plurality of devices in accordance with the rule. In some further embodiments, a computer program product in a computer readable medium for changing focus between a first device and a second device may include first instructions for identifying a plurality of devices; second instructions for identifying a spatial arrangement between a display associated with a first of the plurality of devices and a display associated with a second of the plurality of devices; and third instructions for shifting focus between the first of the plurality of devices and the second of the plurality of devices based on movement of a cursor on the display associated with the first of the plurality of devices. In some other embodiments, a computer program product in a computer readable medium for changing focus between a first device and a second device may include first instructions for identifying a spatial arrangement between a display associated with the first device and a display associated with the second device; second instructions for shifting position of a cursor from the display associated with the first device to the display associated with the second device when the cursor is positioned in a designated area on the display associated with the first device; and third instructions for shifting focus between the first device and the second device when the cursor is positioned in a designated area on the display associated with the first device.

With these and other advantages and features of the invention that will become hereinafter apparent, the nature of the invention may be more clearly understood by reference to the following detailed description of the invention, the appended claims and to the several drawings attached herein.

BRIEF DESCRIPTION OF THE DRAWINGS

The accompanying drawings, which are incorporated in and form a part of the specification, illustrate the preferred embodiments of the present invention, and together with the descriptions serve to explain the principles of the invention.

DETAILED DESCRIPTION

Figure 1:
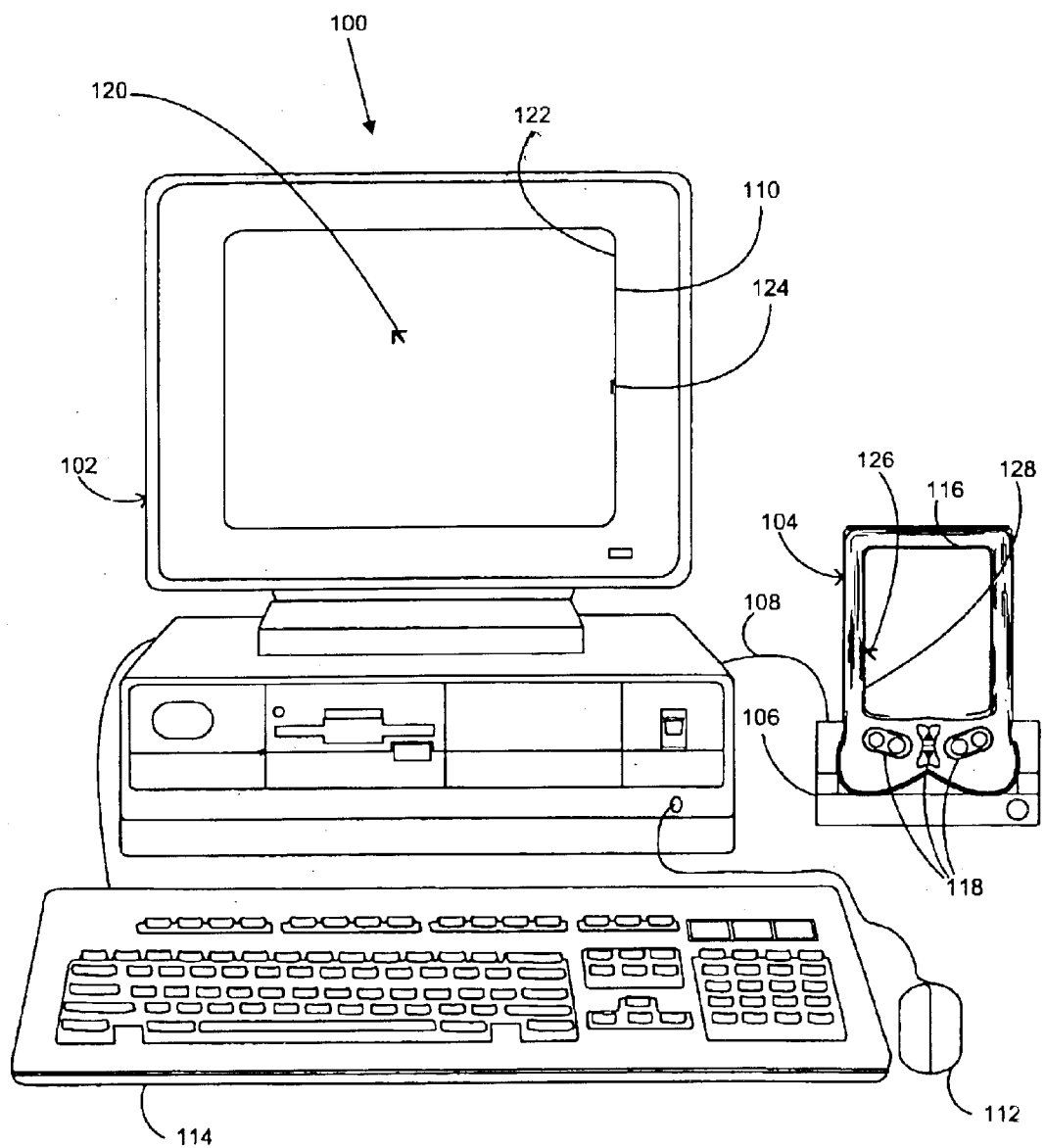
FIG. 1 is an illustration of operation of devices in accordance with the present invention.

Applicant has recognized that there is a need for systems, means, computer code and methods that allow focus to change or be shifted from one device to another device. A change of focus from one device to another device may be based, in whole or in part, on one or more established or designated rules. For example, positioning of a cursor on or in a designated area or location on a display associated with a first device (e.g., a computer) may cause focus to shift from the computer to a second device (e.g., a PDA, a second computer) directly or indirectly connected to or in communication with the first device. Such connection may include a physical wire or cable connected between the two devices or may occur via wireless transmissions or communications (e.g., radio frequency or infrared transmissions). In some embodiments, the two devices may be capable of being used independently and autonomously from each other, may operate under different operating systems, and/or may be connected to each other or in communication with each other primarily for purposes of exchanging data, software, etc. In some embodiments, the two devices may be the same type of device. That is, both devices may be computers, PDAs, etc. Alternatively, in other embodiments, the devices may be of different types. In some embodiments, more than two devices may be used and focus shifted between the more than two devices in accordance with the methods described herein.

Each device may include a processor capable of operating the device, executing software, etc. For purposes of the present invention, a device may include one or more displays (e.g., screens, monitors, CRTS) and, in some embodiments, hardware and software needed to use the display, present text, icons, messages, graphics, etc. on the display, etc. Typically, a device will include a processor or controller capable of executing or implementing software and also may include memory or data storage, input devices (e.g., keyboard, stylus), output devices (e.g., printer, speaker), etc.

For purposes of the present invention, in some embodiments providing "focus" on or to a device may mean, refer to and/or include that the device may receive inputs, the device is active, a window, icon or software operating on the device may become active, a window or software operating on the device may become capable of receiving inputs, that an application or other software operating on the device has focus, the device is enabled for typing or menu activity from a keyboard or other input device, a window or software operating on the device is enabled for typing or menu activity from a keyboard or other input device, a contextual operation environment is or has been provided to the device or an application operating on the device, a etc. In some embodiments, a change or shift of focus from one device to a second device may be, refer to, mean or include changing or shifting focus or context from an application, icon or window operating or displayed on the first device to an application, icon or window operating or displayed on the second device. In some embodiments, a device or software application may indicate possession of focus, a change of possession of focus, and/or a loss of focus by making a sound, displaying an icon, text message or image, changing the look or location of an icon, changing background or foreground color, etc. In some embodiments, a change of or shift in focus from one application to another application and/or from one device to another device may result in or require changes in registry or registration information or settings, configuration information or settings, operating system information or settings, initialization information or settings, a change in context or contextual operation of an input device or application, context switching or activity between the two applications, etc.

In some embodiments, once focus has shifted from a first device to a second device, the cursor may appear on a display associated with the second device. Positioning of the cursor on or in a designated area or location on the display associated with a second device may cause focus to shift from the second device to the first device. Alternatively, positioning of the cursor on or in a designated area or location on the display associated with a first device may cause focus to shift from the second device to the first device. Different rules may govern when focus is shifted from the first device to the second device as compared to when focus is shifted from the second device to the first device. Software operating on one or both of the devices may control implementation and management of the rules, as well as the change of focus from one device to another device. In some embodiments, more than two devices might be used. These and other features will be discussed in further detail below, by describing a system, individual devices, and processes according to embodiments of the invention.

System

Now referring to FIG. 1, a system 100 includes two devices, namely a computer 102 and a PDA 104. The PDA 104 is positioned in a cradle or dock 106 that is connected to the computer 102 via a cable 108. While connection between the computer 102 and the PDA 104 is shown via the cable 108, in some embodiments the computer 102 and the PDA 104 may communicate with each other via wireless transmission.

The computer 102 may include a display, CRT or screen 110 and one or more input devices, such as a mouse 112 and a keyboard 114. The computer 102 may be or include any type of computer, computer system, etc. and may have many different hardware and/or software configurations. Similarly, the PDA 104 may include a display or screen 116 and input buttons 118. The PDA 104 also may be or include many different hardware and/or software configurations. For example, the PDA 104 may be or include a Palm™ M515 or VII handheld device, a Handspring™ Visor Pro or Visor Edge handheld device, a HP Jornada™ Pocket PC device, or a Compaq™ iPAQ Pocket PC H3870 or H3760 device.

Typically, a cursor 120 will be illustrated or shown on the display or screen 110 of the computer 102. Moving the mouse 112 may result in a corresponding movement of the cursor 120 on the display 110.

A user may interact with the computer 102 by using either or both the mouse 112 and the keyboard 114. In addition, the user may interact with the PDA 104 by using the buttons 118 or by tapping (e.g., with a stylus) on the display 116 if the display 116 is a touch screen. Software operating on the computer 102 and the PDA 104 may allow data and programs to be transferred between the computer 102 and the PDA 104.

In some embodiments, one or more rules may be used to govern when focus is shifted from one device to another device. Software may be operating in conjunction with the devices to implement the rule(s), control shifting of focus from one device to another device, etc. The software may be resident and operating on one or both of the devices or act in a distributed manner on the two devices.

In some embodiments of the present invention, the position or movement of the cursor 120 on the display 110 of the computer 102 may be used to control the direction of inputs from the mouse 112 or the keyboard 114 and/or whether focus is on the computer 102 or the PDA 104. For example, focus may shift from the computer 102 to the PDA 104, or from an application operating on the computer 102 to an application operating on the PDA 104, if the cursor 120 is positioned along the right side or edge of the display 110.

In some embodiments, in addition to interacting directly with the PDA 104 via the buttons 118, the user also may interact directly with the PDA 104 via the mouse 112 and/or the keyboard 114 depending on the position of the cursor 120 on the display 110. Continuing the previous example, so long as the cursor 120 is positioned anywhere on the display 110 except along the right edge 122 of the display 110, all inputs made via the mouse 112 or the keyboard 114 will be directed to the computer 102 and/or and operating system or application operating on the computer 102. Thus, the focus of activity remains on the computer 102 and/or an application operating on the computer 102. If however, the cursor 120 is positioned along the right edge 122 of the display 110, as illustrated by the mark 124 on the display 110, all inputs made via the mouse 112 or the keyboard 114 will be directed to the PDA 104 and/or an operating system or application operating on the PDA 104. Thus, the focus of activity will be directed to the PDA 104 and/or an application operating on the PDA 104.

A user may load, access and use applications on the computer 102 using the keyboard 114 and the mouse 112 as long as focus is provided to the computer 102, as indicated by the position of the cursor 120 on the display 110 in locations on the display 110 other than along or in the right edge 122 of the display 110. Similarly, the user may load, access and use applications on the PDA 104 using the keyboard 114 and the mouse 112 so long as focus is provided to the PDA 104, as indicated by the position of the cursor 120 in locations in or along the right edge 122 of the display 110 of the computer 102 and/or the position of the cursor 120 in locations on the display 116 of the PDA other than the left edge of the display 116.

In some embodiments, movement of the cursor 120 along or in the right edge or side 122 of the display 110 may cause the cursor 120 to appear on the display 116 of the PDA 104, as illustrated by the mark 126 on the display 116. The cursor 120 may immediately shift or appear to move from the display 110 to the display 116 or gradually shift or appear to move from the display 110 to the display 116. Further movements of the mouse 112 may cause the cursor 120 to change position on the display 116 of the PDA 104. The focus of activity will remain on the PDA 104, and/or software operating on the PDA 104, until such time as the cursor 120 is positioned along the left edge or side 128 of the display 116.

In some embodiments, the PDA 104 may not use or display a cursor. Thus, when the cursor 122 is moved along or in the right edge or side 122 of the display 110, the PDA 104 may still gain focus. In addition, the PDA 104 may be able to receive inputs from the keyboard 114 and/or the mouse 112. The PDA 104 may indicate that it has focus by lighting up the display 110, by flashing or otherwise providing a message or image (which may be an image of a cursor) on the display 116, by providing a signal or sound via the cradle 106, displaying an icon on the display 116, etc.

In the previous example, a spatial relationship is established between the computer 102 and the PDA 104. That is, positioning of the cursor 120 along or in the right edge or side 122 of the display 110 is used to change focus from the computer 102 to the PDA 104 and positioning of the cursor 120 along or in the left edge 128 of the display 116 is used to change focus from the PDA 104 to the computer 102.

In some embodiments, different spatial relationships may be used between the computer 102 and the PDA 104. For example, now referring to FIGS. 2 and 3, the PDA 104 is now located to the left display 110. Note that, for purposes of discussion of FIGS. 2 and 3, the computer 102 and the PDA 104 are assumed to be connected or in communication in some fashion, even though the cradle 106 and the cable 108 are not shown in FIG. 2 or FIG. 3.

Figure 2:
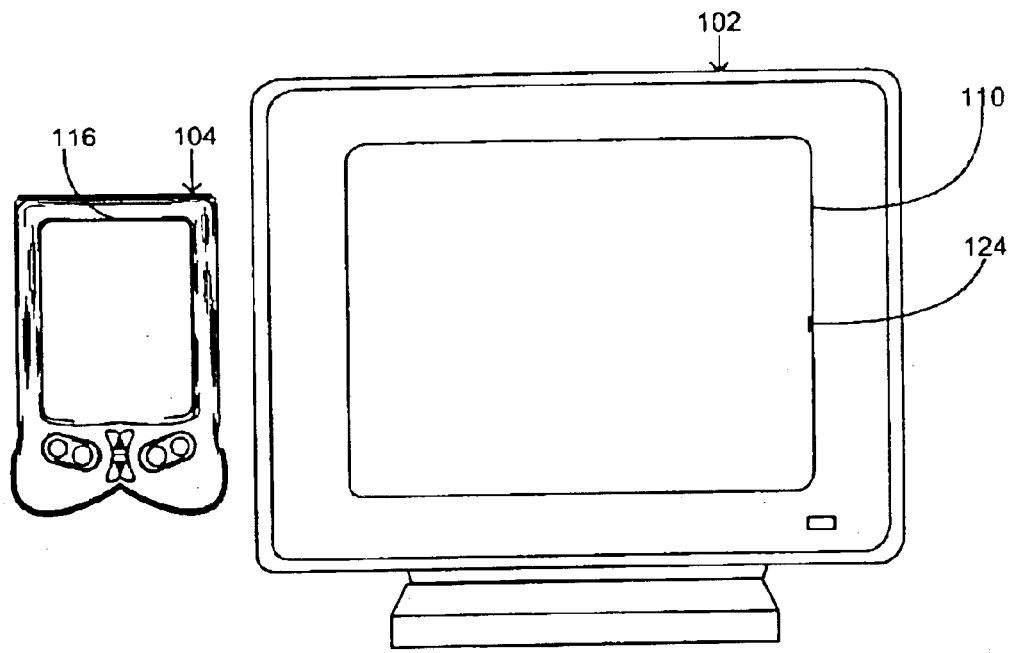
FIG. 2 is another illustration of a representative operation of the two devices of FIG. 1.
Figure 3:
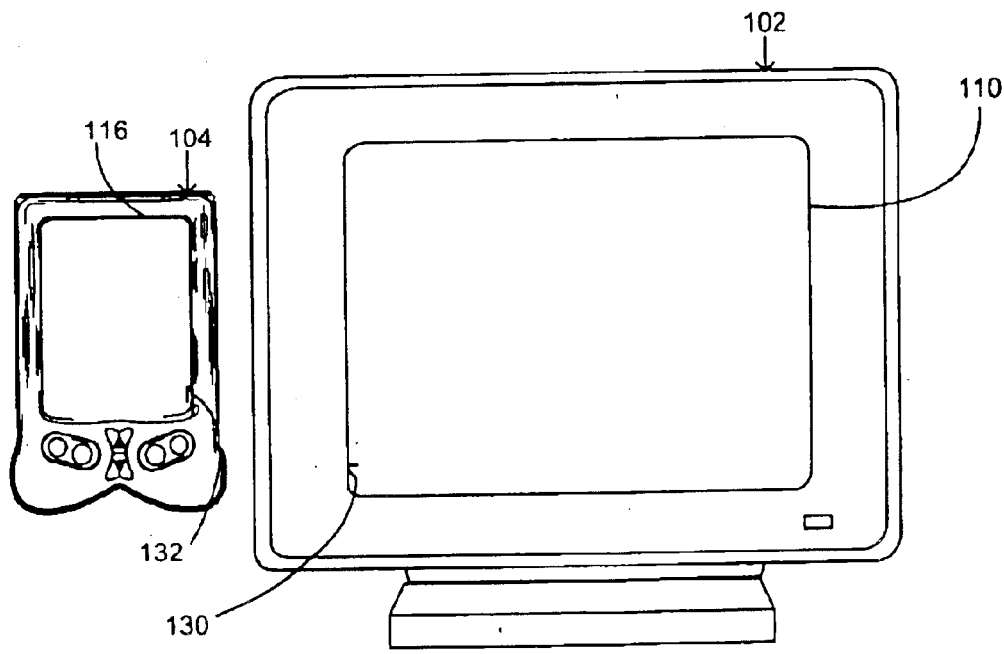
FIG. 3 is another illustration of a representative operation of the two devices of FIG. 1.

In the orientation of the computer 102 and the PDA 104 shown in FIGS. 2 and 3, positioning the cursor 120 in the position 124 may not change focus from the computer 102 to the PDA 104. Rather, positioning the cursor 120 to a location along the left edge or area 130 of the display 110 may change focus from the computer 102 to the PDA 104. Similarly, if the cursor 120 is shown on the display 116 of the PDA 104 while focus is provided to the PDA 104, the focus may remain on the PDA 104 until such time as the cursor is moved to the right edge or area 132 of the display 116 of the PDA 104, at which time focus will shift back to the computer 102.

Figure 4:
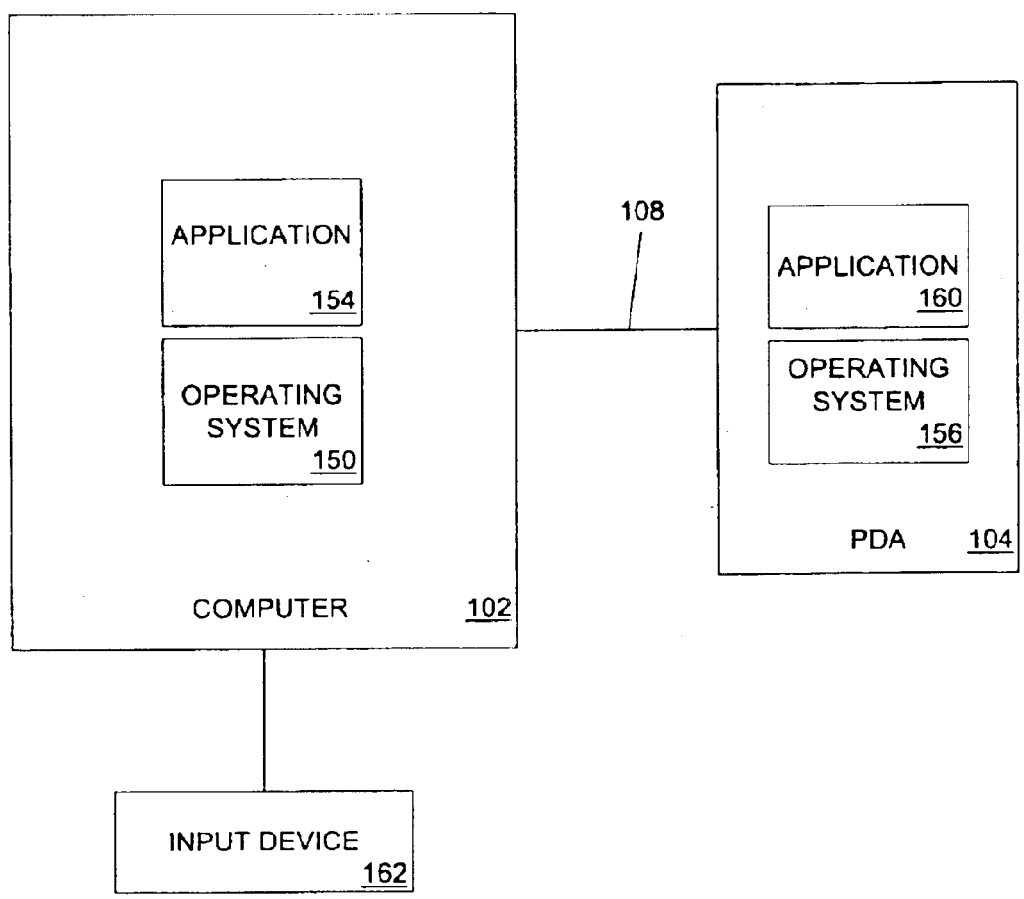
FIG. 4 is a block diagram of components for the devices of FIG. 1.

Now referring to FIG. 4, a block diagram of the computer 102 and the PDA 104 are illustrated along with representative software components. Many different types of implementations or hardware/software configurations can be used for the computer 102 and/or the PDA 104, and with the methods disclosed herein, and the methods disclosed herein are not limited to any specific hardware/software configuration for the computer 102 and/or the PDA 104.

In the representative computer 102 illustrated in FIG. 4, the computer 102 may include an operating system 150 and at least one application 154. Similarly, the PDA 104 may include an operating system 156 and at least one application 160. One or more input devices 162 (e.g., the mouse 112, the keyboard 114) may be connected to the computer 102. Either or both of the computer 102 and the PDA 104 may include other software and/or hardware components not shown in FIG. 4 (e.g., output devices, input devices, memory, data storage, databases, applications, interfaces, control programs, processors or controllers, communication ports, clocks, etc.).

In some embodiments, the operating system 150 may recognize and/or establish connection of the PDA 104 to the cradle 106 and facilitate communication, data transfer, etc. between the computer 102 and the PDA 104. The operating system 150 may track and recognize the position of the cursor 120 and change focus between the computer 102 and the PDA 104 depending on the position of the cursor 120. When focus is provided to or on the computer 102, the operating system 150 may direct input from the input device 162 for use with the computer 150, the application 154, etc.

In some embodiments, the application 154 may recognize and/or establish connection of the PDA 104 to the cradle 106 and facilitate communication, data transfer, etc. between the computer 102 and the PDA 104. The application 154 may track and recognize the position of the cursor 120 and change focus between the computer 102 and the PDA 104 depending on the position of the cursor 120. As previously discussed above, such change in focus from the computer 102 to the PDA 104 may comprise or include a change in focus from an application operating on the computer 102 to an application operating on the PDA 104. When focus is provided to or on the computer 102, the application 154 may direct input from the input device 162 for use with the computer 150, the application 154, the operating system 150, etc. Alternatively, in some embodiments, when focus is provided to or on the PDA 104, the operating system 150 may direct input from the input device 162 to the PDA 104, the application 160, the operating system 156, etc. Thus, in some embodiments, the control or management of focus and the shifting of focus between the computer 102 and the PDA 104 may be handled by the operating system 150 and/or the application 154, particularly when managing or controlling a change of focus from the computer 102 to the PDA 104. In other embodiments, the control or management of focus and the shifting of focus from between the computer 102 and the PDA 104 may be handled by the operating system 156 and/or the application 160, particularly when managing or controlling a change of focus from the PDA 104 to the computer 102. In other embodiments, the control or management of focus and the shifting of focus from the computer 102 and the PDA 104, and vice versa, may be handled by the operating system 150 and/or the application 154 in conjunction with the operating system 156 and/or the application 160.

When focus is shifted from the computer 102 to the PDA 104, the operating system 156 and/or the application 160 resident on the PDA 104 may control or manage inputs from the input device 162 provided to the PDA 104 by the computer 102 via the cable 108. For example, the operating system 156 may process inputs or signals initiated or originated by the input device 162 and received from computer 102 via the cable 108. In some embodiments, inputs or signals initiated by the input device 162 may be altered, mapped, reformatted, or transformed by the computer 102 (e.g., by the operating system 150 or the application 154) prior to sending them to the PDA 104 or by the PDA 104 (e.g., by the operating system 156 or the application 160) after receiving them from the computer 102. For example, the application 160 or the operating system 156 operating on the PDA 104 may not recognize or use some signals generated by the input device 162. Thus, the operating system 150 or the application 154 operating on the computer 102 may transform or map signals initiated by the input device 162 into a signal that can be recognized and used by the operating system 156 or the application 160 operating on the PDA 104. As another example, the operating system 156 may take signals initiated by the input device 162 and received from the computer 102 and transform or map them into signals that can be recognized and used by the application 160. As a third example, the application 160 may take signals initiated by the input device 162 and received from the computer 102 and transform or map them into signals that can be recognized and used by the operating system 156 or other software operating on the PDA 104.

In some embodiments, software may be operating in conjunction with the computer 102 and/or the PDA 104 to implement one or more rules regarding the change or shift of focus from the computer 102 to the PDA, and vice versa. The software may be resident and operating on one or both of the devices 102, 104, or act in a distributed manner on the two devices 102, 104. In some embodiments, the software may operate in conjunction with, or be part of, the application 154 and/or the operating system 150 resident on the computer 102. Similarly, in some embodiments, the software may operate in conjunction with, or be part of, the application 156 and/or the operating system 156 resident on the PDA 104.

While the system 100 and the methods described herein primarily relate to the use of a computer and a PDA, the methods and systems of the present invention also work with other combinations of devices. In some embodiments such devices may be or include one or more of the following: personal computer, portable computer, mobile or fixed user station, workstation, network terminal or server, telephone, beeper, kiosk, personal digital assistant, facsimile machine, two-way pager, radio, cable set-top box, etc.

Process Description

Figure 5:
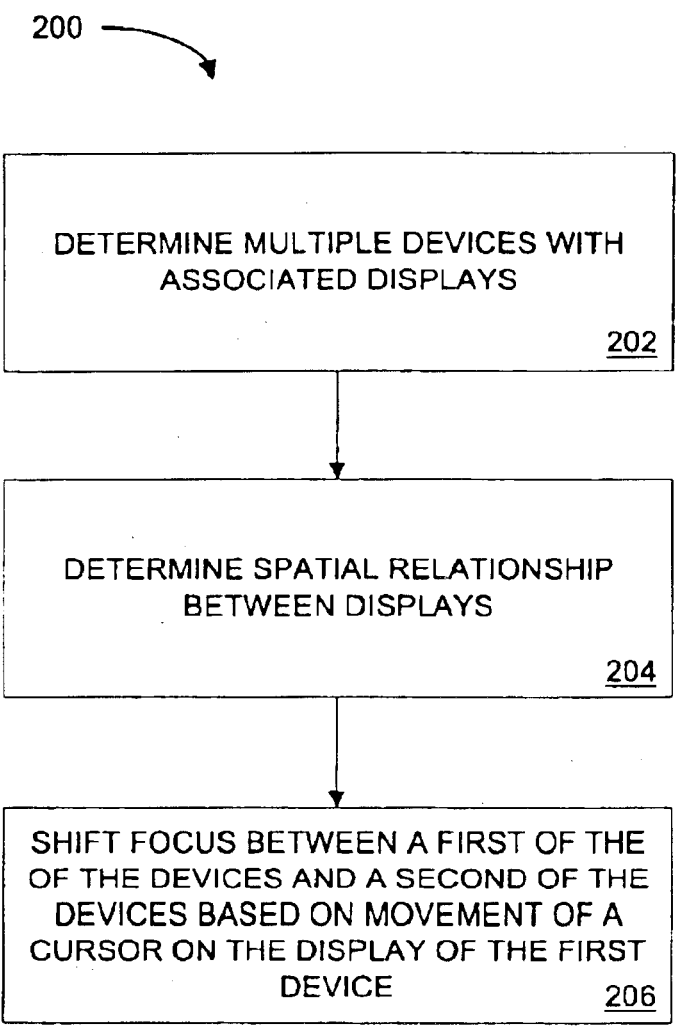
FIG. 5 is a representation of a first embodiment of a method in accordance with the present invention and usable with the devices of FIG. 1.

Reference is now made to FIG. 5, where a flow chart 200 is shown which represents the operation of a first embodiment of the present invention. The particular arrangement of elements in the flow chart 200 is not meant to imply a fixed order to the steps; embodiments of the present invention can be practiced in any order that is practicable.

Processing begins at a step 202 during which multiple devices (e.g., the computer 102, the PDA 104) with multiple displays are determined or recognized. For example, the application 154 or the operating system 150 operating or resident on the computer 102 may recognize that the computer 102 and the PDA 104 are in communication or are at least connected (e.g., via the cradle 106 and the cable 108). Such a determination may be made at many times such as, for example, when the computer 102 is first booted or powered up, when the PDA 104 is placed in the cradle 108, when the application 154 is first loaded up or initialized, etc. In addition, the PDA 104, or the application 160 or the operating system 156 operating or resident on the PDA 104, may recognize or enable communication via the cable 108 when the PDA 104 is placed in the cradle 106.

In some embodiments, the step 202, or determining one or more devices, may be or include one or more of the following: receiving data indicative of at least one of a plurality of devices; selecting at least one device from a plurality of devices associated with a user; receiving data indicative of at least one of a plurality of devices associated with a user; recognizing or otherwise determining the existence of two or more connected devices, recognizing or establishing a connection (which might be wireless) between two or more devices, recognizing or establishing a relationship between two or more devices such that focus can shift between the devices, recognizing or otherwise determining that a relationship exists between two or more devices such that focus can shift between the devices, etc. In some embodiments, software implementing the step 202 or the method 200 may be configured to recognize devices, establish a relationship between devices such that focus between the devices can change, etc., or be used in establishing the connection or relationship between the devices.

During an optional step 204, a spatial relationship between displays forming part of or otherwise associated with the devices determined during the step 202 is recognized or otherwise determined. The spatial relationship may indicate the relative positions of two or more of the displays. For example, in FIG. 1, the display 110 of the computer 102 is positioned to the left of the display 116 of the PDA 104. In FIGS. 2 and 3, the display 110 of the computer 102 is positioned to the right of the display 116 of the PDA 104.

In some embodiments, a spatial relationship between two or more devices may be assumed unless altered by a user or application. For example, the display 116 of the PDA 104 may be assumed to be positioned to the right of the display 110 of the computer 102 unless otherwise indicated. In other embodiments, the operating system 150 or the application 154 may ask a user to select or indicate a spatial relationship between the devices (or their respective displays).

In some embodiments, determining a spatial arrangement between two or more devices may be or include receiving data indicative of the spatial arrangement; allowing a user to designate the spatial arrangement; allowing an application operating on the first device to designate the spatial arrangement; and/or allowing an application operating on the second device to designate the spatial arrangement; detecting a spatial arrangement between two devices; etc. For example, in some embodiments, hardware and/or software operating on or in conjunction with two or more devices might detect a spatial arrangement between the two devices or a spatial arrangement between displays associated with the two devices.

The spatial relationship between two or more devices or their displays may be used to control or manage change of focus between the devices. For example, as previously discussed above, when the PDA 104 is positioned to the right of the display 110 of the computer 102, positioning the cursor 120 along the right edge 122 of the display 110 may cause focus to change from the computer 102 to the PDA 104. If the PDA 104 is positioned to the left of the display 110 of the computer 102, positioning the cursor along the right edge of the display 110 may not cause focus to change from the computer 102 to the PDA 104. Rather, positioning the cursor 120 along the left edge 130 of the display 110 may cause focus to change from the computer 102 to the PDA 104.

During a step 206, focus is changed between the devices determined during the step 202 (e.g., the computer 102 and the PDA 104) depending on where the cursor 120 is positioned as governed by the spatial relationship between the devices (or their respective displays).

In some embodiments, changing focus from a first device to a second device depending on location of a cursor may be, result in, require, or include the first device no longer being active and the second device becoming active, an application on the first device no longer being active and an application on the second device becoming active, the second device becoming capable of receiving an input, an application operating on the second device becoming capable of receiving an input, the first device becoming incapable of receiving an input, an application on the first device becoming incapable of receiving an input, etc. In some embodiments, changing or shifting focus from the device to the second device may cause a change in registry settings or information, configuration settings or information, initialization settings or information, and/or operating system settings or information for the first device, the second device, an application or operating system operating on the first device, and/or an application or operating system operating on the second device. In some embodiments, changing focus from a first device to a second device depending on a location of a cursor may be, result in, require or include changing focus from an application operating on the first device to an application operating on the second device.

Figure 6:
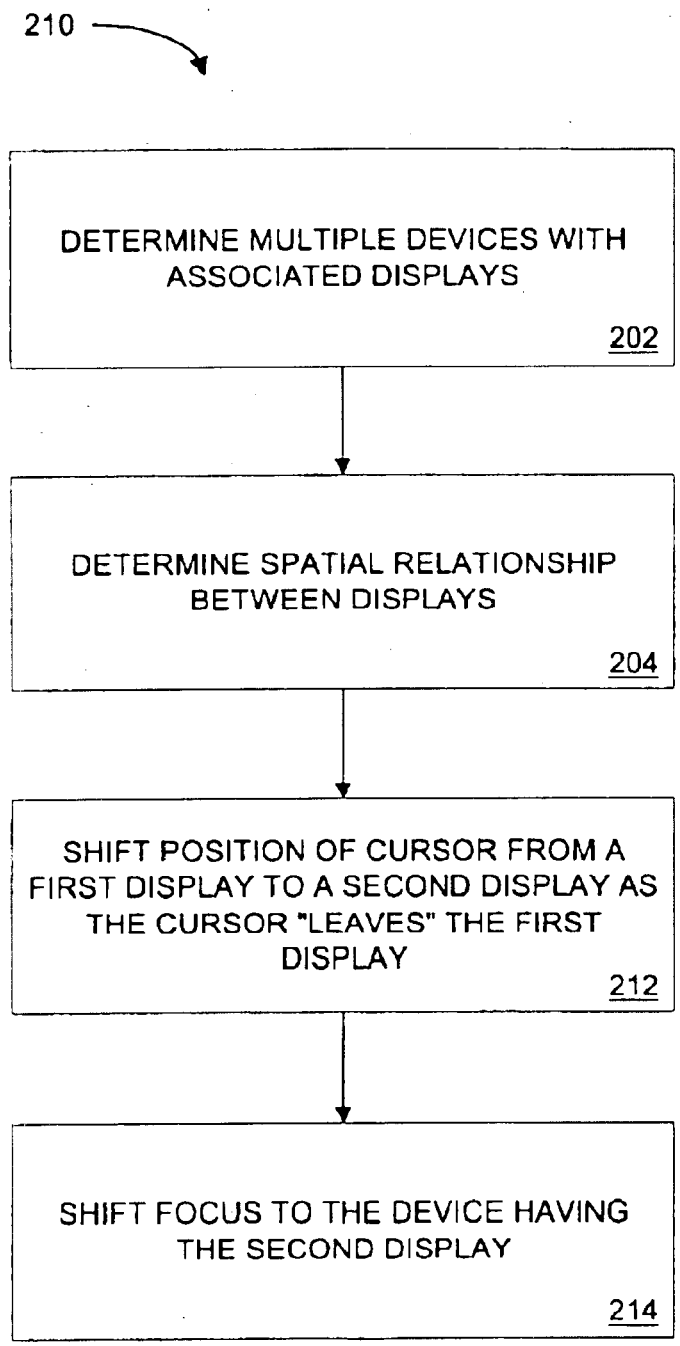
FIG. 6 is a representation of a second embodiment of a method in accordance with the present invention and usable with the devices of FIG. 1.

Reference is now made to FIG. 6, where a flow chart 210 is shown which represents the operation of a second embodiment of the present invention. The particular arrangement of elements in the flow chart 210 is not meant to imply a fixed order to the steps; embodiments of the present invention can be practiced in any order that is practicable. The method 210 is particularly suited for embodiments where the cursor 120 may appear on different displays (e.g., the cursor may appear on the display 110 of the computer 102 and the display 116 of the PDA 104). Note that the cursor may take different forms, looks, colors, sizes, shapes, etc. when changing from a position on a first display to a position on a second display. Thus, the PDA 104 may display the cursor 120 differently on the display 116 than the computer 102 does on the display 110.

The method 210 includes the steps 202 and 204 previously discussed above. In addition, the method 210 includes a step 212 during which position of a cursor 120 is changed from a first display to a second display as the cursor 120 "leaves" the first display. For example, in the example previously discussed above with regard to FIG. 1, moving the cursor 120 to or along the right edge 122 of the display 110 may cause the cursor 120 to stop appearing on the display 110 of the computer 102 and start appearing on the display 116 of the PDA 104. The mark 126 on the display 116 indicates that the cursor 120 is starting to appear on the display 116 and disappear from the display 110.

During a step 214, focus is shifted from the first display to the second display as the cursor 120 leaves the first display (e.g., when some or all of the cursor is no longer shown or no longer appears on the first display) and enters the second display (e.g., when some or all of the cursor now appears on the second display).

Figure 7:
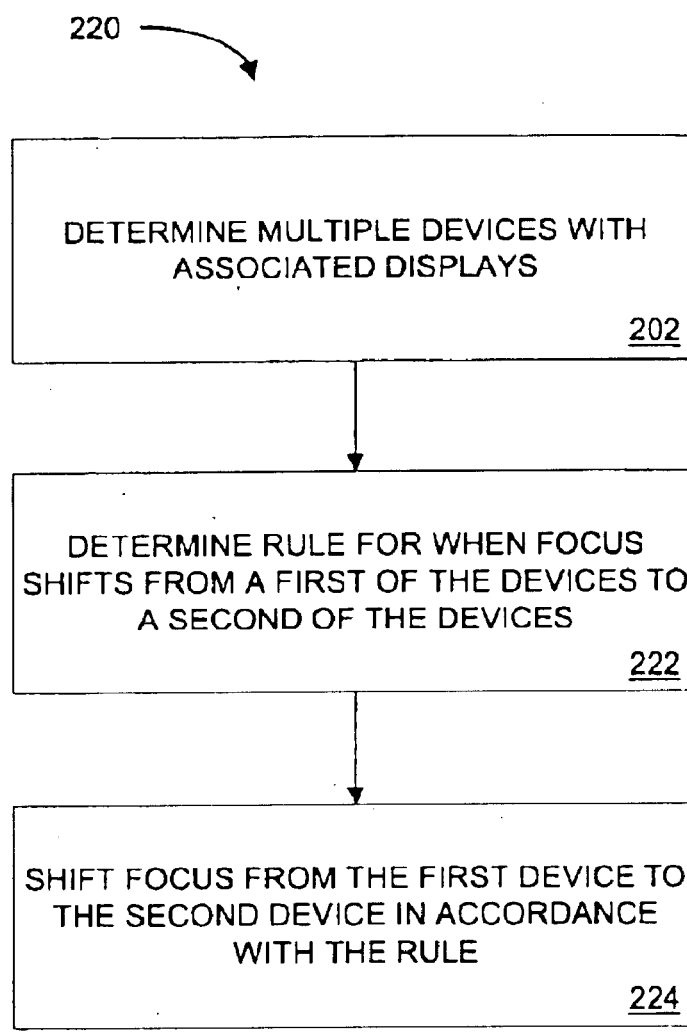
FIG. 7 is a representation of a third embodiment of a method in accordance with the present invention and usable with the devices of FIG. 1.

Reference is now made to FIG. 7, where a flow chart 220 is shown which represents the operation of a second embodiment of the present invention. The particular arrangement of elements in the flow chart 220 is not meant to imply a fixed order to the steps; embodiments of the present invention can be practiced in any order that is practicable.

The method 220 includes the step 202 previously discussed above. In addition, the method 220 includes a step 222 during which a rule is recognized, established or otherwise determined governing or managing when focus shifts from a first of the devices determined during the step 202 to a second of the devices determined during the step 202. For example, a rule may be based on a position of the cursor 120 on the display 110 of the computer 102. So long as the cursor 120 is not in a designated area (e.g., right edge of the display 110, center of the display 110, within a box, icon, etc. appearing on the display 110), the focus remains on the computer 102. When the cursor 120 is moved to the designated position or area, the focus shifts from the computer 102 to the PDA 104. If the cursor 120 is not displayed on or by the PDA 104 when focus is on the PDA 104, the focus may remain on the PDA 104 until the cursor 120 is moved out of the designated area on the display 110, until a command is entered on the PDA 104, etc. If the cursor 120 is displayed on the PDA 104 when focus is on the PDA 104, the focus may remain on the PDA 104 until the cursor 120 is moved to a designated position or area on the display 116 (e.g., the left edge of the display 116, an icon appearing on the display 116).

Other rules may be based on different events other than the position or movement of the cursor. For example, entry of a designated keystroke on the keyboard 114 may cause focus to shift from the computer 102 to the PDA 104. Another keystroke entry may shift focus from the PDA 104 back to the computer 102. As another example, a rule may be based on a user action or the occurrence of a designated event (e.g., entering a specific sequence of keys or a command, moving a cursor to a specific position on the display 116, selecting a focus shifting command from a menu or toolbar, entering or making a specific vocal command or sound when the computer 102 or the PDA 104 is able to accept process such audible input, etc.). The occurrence of the designated event or the user action may cause focus to shift from the computer 102 to the PDA 104, or vice versa.

In some embodiments, determining one or more rules may be or include one or more of the following: receiving a rule from a user; retrieving a rule; implementing a designated rule; determining a rule associated with a device; determining a rule associated with software operating on a device; determining a rule associated with a specific user; receiving or retrieving data indicative of a rule; allowing a user to select or designate a rule; etc.

During a step 224, focus is shifted from a first device determined during the step 202 to a second device determined during the step 202 in accordance with the rule determined during the step 222. In some embodiments, more than one rule may be used and/or more than two displays or devices may be involved.

In some embodiments, changing of shifting focus from a first device to a second device in accordance with a rule may be, result in, require or include the first device no longer being active and the second device becoming active, an application on the first device no longer being active and an application on the second device becoming active, the second device becoming capable of receiving an input, an application operating on the second device becoming capable of receiving an input, the first device becoming incapable of receiving an input, an application on the first device becoming incapable of receiving an input, etc. In some embodiments, changing or shifting focus from the device to the second device may cause a change in registry settings or information, configuration settings or information, initialization settings or information, and/or operating system settings or information for the first device, the second device, an application or operating system operating on the first device, and/or an application or operating system operating on the second device. In some embodiments, changing focus from a first device to a second device in accordance with a rule may be, result in, require or include changing focus from an application operating on the first device to an application operating on the second device. In some embodiments of the methods disclosed herein, a user may choose or select to enable focus shifting between two or more devices. For, example, a user may have a computer connected to a PDA to enable transfer of data from the computer to the PDA, or vice versa. However, the user may not want focus to shift from the computer to the PDA unless the user specifically enables, authorizes or initiates such focus changing ability. Thus, the methods may include steps of receiving or detecting such user enablement, authorization or initiation, requesting consent from the user to enable, authorize or initiate focus changing capabilities, or displaying information regarding the ability of two devices to change focus when enabled, authorized or initiated by the user.

The methods of the present invention may be embodied as a computer program developed using an object oriented language that allows the modeling of complex systems with modular objects to create abstractions that are representative of real world, physical objects and their interrelationships. However, it would be understood by one of ordinary skill in the art that the invention as described herein could be implemented in many different ways using a wide range of programming techniques as well as general-purpose hardware systems or dedicated controllers. In addition, many, if not all, of the steps for the methods described above are optional or can be combined or performed in one or more alternative orders or sequences without departing from the scope of the present invention and the claims should not be construed as being limited to any particular order or sequence, unless specifically indicated.

Each of the methods described above can be performed on a single computer, computer system, microprocessor, etc. In addition, two or more of the steps in each of the methods described above could be performed on two or more different computers, computer systems, microprocessors, etc., some or all of which may be locally or remotely configured. The methods can be implemented in any sort or implementation of computer software, program, sets of instructions, code, ASIC, or specially designed chips, logic gates, or other hardware structured to directly effect or implement such software, programs, sets of instructions or code. The computer software, program, sets of instructions or code can be storable, writeable, or savable on any computer usable or readable media or other program storage device or media such as a floppy or other magnetic or optical disk, magnetic or optical tape, CD-ROM, DVD, punch cards, paper tape, hard disk drive, Zip™ disk, flash or optical memory card, microprocessor, solid state memory device, RAM, EPROM, or ROM.

Although the present invention has been described with respect to various embodiments thereof, those skilled in the art will note that various substitutions may be made to those embodiments described herein without departing from the spirit and scope of the present invention.

The words "comprise," "comprises," "comprising," "include," "including," and "includes" when used in this specification and in the following claims are intended to specify the presence of stated features, elements, integers, components, or steps, but they do not preclude the presence or addition of one or more other features, elements, integers, components, steps, or groups thereof.

The embodiments of the invention in which an exclusive property or privilege is claimed are defined as follows:

1. A method comprising:

coupling a personal data assistant (PDA) to a computer;

prompting a user to indicate a spatial relationship between the computer and the PDA; and providing via the computer input signals from an input device that is coupled to the computer to control a position of a first cursor on a display that is part of the PDA.

2. The method of claim 1, further comprising:

prior to the providing input signals from said input device to control the position of the first cursor, controlling a position of a second cursor on a display that is part of the computer in response to input signals from said input device.

3. The method of claim 2, further comprising:
after the providing the input signals from said input device to control the position of the first cursor, controlling the position of the second cursor on the display that is part of the computer in response to input signals from said input device.

4. The method of claim 1, wherein the input device is a pointing device.

5. The method of claim 4, wherein the input device is a mouse.

* * * * *